United States Patent [19]
Takai et al.

[11] Patent Number: 5,555,239
[45] Date of Patent: Sep. 10, 1996

[54] DISK SYSTEM

[75] Inventors: Kazuki Takai, Tokyo; Yoshihiro Inoue, Nagoya, both of Japan

[73] Assignee: Clarion Co., Ltd., Tokyo, Japan

[21] Appl. No.: 393,505

[22] Filed: Feb. 23, 1995

Related U.S. Application Data

[63] Continuation of Ser. No. 105,285, Aug. 6, 1993, abandoned.

[30] Foreign Application Priority Data

Aug. 10, 1992 [JP] Japan ................................ 4-212926

[51] Int. Cl.⁶ ........................... G11B 17/10; G11B 17/22
[52] U.S. Cl. ............................................. 369/192; 369/178
[58] Field of Search .......................... 369/36, 178, 192, 369/75.1, 264, 196

[56] References Cited

U.S. PATENT DOCUMENTS

| | | | |
|---|---|---|---|
| 5,119,354 | 6/1992 | Umesaki | 369/36 |
| 5,136,562 | 8/1992 | Staar | 369/36 |
| 5,150,341 | 9/1992 | Shibayama | 369/178 |
| 5,265,078 | 11/1993 | Akiyama et al. | 369/192 |

FOREIGN PATENT DOCUMENTS

2-260274  10/1990  Japan.

*Primary Examiner*—Stuart S. Levy
*Assistant Examiner*—George J. Letscher
*Attorney, Agent, or Firm*—Paul J. Lerner

[57] ABSTRACT

A reduction in the size of a CD player is achieved by making the transfer roller horizontally displaceable between a first position, adjacent the disk storage magazine, and a second position, adjacent the turntable. The roller is displaced to the first position while a disk is being played. Further size reduction is achieved by making the turntable horizontally displaceable between a first position, remote from the storage magazine, and a second position, closer thereto. The turntable is in the second position while a disk is being played.

9 Claims, 13 Drawing Sheets

DISK SYSTEM

This is a continuation of U.S. patent application Ser. No. 08/105,285 filed on Aug. 6, 1993, now abandoned.

BACKGROUND OF THE INVENTION

The present invention relates to a disk system capable of storing a plurality of disks, for example CD's (compact disks), selecting a desired one of the disks, and processing the data stored in the selected disk.

A disk storage device, suitable for use in conjunction with the present invention is described in Applicants' co-pending U.S. patent application Ser. No. 08/103,355 filed concurrently herewith. In recent years, there has been developed and widely used a disk system including a storage portion, capable of storing a plurality of disks, and a processing portion for processing the data stored in a desired disk. The desired disk is selected by an operator and is then conveyed from the storage portion to the processing portion. Such systems are often utilized as CD players.

Systems of this type are generally equipped with a transfer portion for automatically transferring the selected disk from the storage portion to the processing portion where it is played. Systems including such transfer portions must have space, in the longitudinal direction, sufficient to array at least two disks transversely.

Since the CD has a diameter of 120 mm, for example, the space for the two disk array is 120 mm×2=240 mm. In the processing or player portion, moreover, a clearance has to be provided around the disk so that it may be allowed to turn. Since a clearance of 5 mm is provided between the inner wall of the system chassis and the disks in the storage portion, the minimum longitudinal size of the system chassis is 240 mm+5 mm ×2=250 mm.

In recent years, therefore, in order to minimize the system size, there has been proposed a disk system wherein the disks stored in the storage portion and the disk set in the playing portion are partially overlapped. A disk system of this type is proposed in Japanese Patent Provisional Publication HEI2- 260274 entitled "Disk Player".

Such a disk system is illustrated in FIGS. 23 to 27. Specifically, as shown in FIGS. 23A and 23B, a system chassis 1 having a rectangular box shape includes a storage portion 2, a transfer portion 3 and a player 4.

Figure 23A:
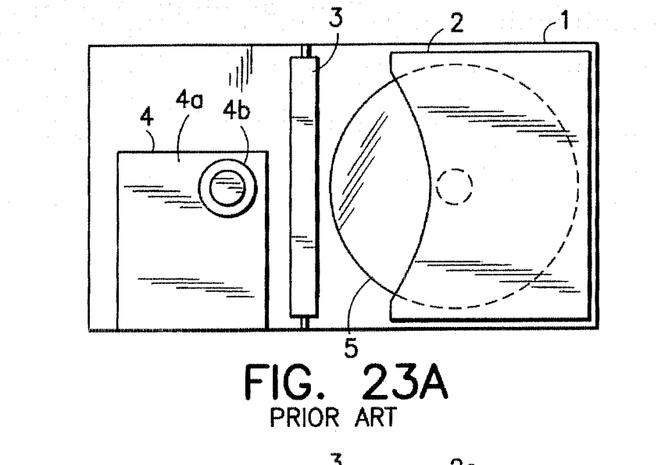
FIG. 23A is a top plan view of a prior art disk system at a disk selecting time.
Figure 23B:
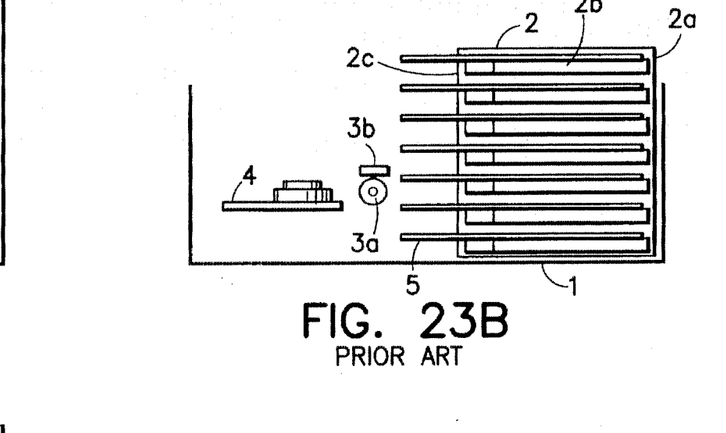
FIG. 23B is a front elevation view of the disk system of FIG. 23A.

Storage portion 2 has a rectangular box shape and is formed in its righthand side with a plurality of slits 2a. Each of slits 2a receives a horizontal planar tray 2b. Tray 2b is equipped with a mechanism (not shown) for transferring its disk to player portion 4. The lefthand side of storage portion 2 is formed with rectangular slits 2c corresponding to trays 2b. Each of openings 2c is arcuately cut, as viewed from the top.

Figure 27:
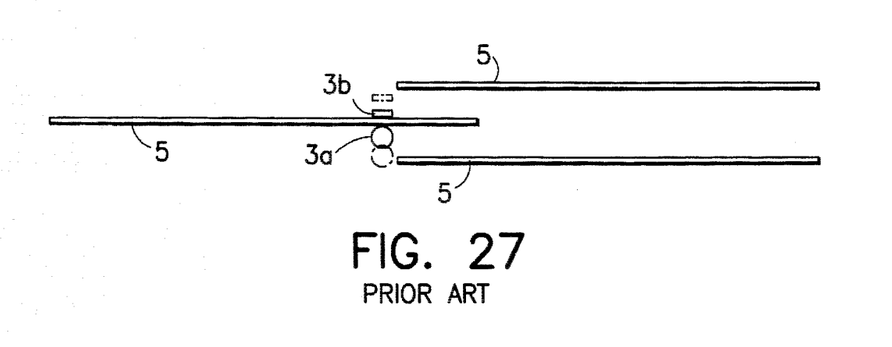
FIG. 27 is a front elevation view showing the positional relations between the transfer portion and the disks of the prior art disk system.

Transfer portion 3 includes a rod-shaped roller 3a and an upguide plate 3b, which extend in the longitudinal direction. Roller 3a, which is rotatable about a longitudinal axis, is positioned adjacent openings 2c of storage portion 2 and has a length greater than the diameter of disk 5. Upguide plate 3b, which has a length equal to that of roller 3a, is superposed thereover. Roller 3a and upguide plate 3b can be vertically displaced as shown in FIG. 27.

Player portion 4 includes a rectangular traverse plate 4a, a turntable 4b arranged over traverse plate 4a, and an optical pickup (not shown). Turntable 4b turns the disk while supporting it. The optical pickup reproduces the data stored in the disk. It is slidable along a straight line extending to the center of turntable 4b.

In the disk system thus constructed, disks 5 are stacked by inserting them one by one through individual slits 2a. Each of disks 5 thus stacked has an end portion exposed at the arcuate recesses formed by openings 2c. Roller 3a and upguide plate 3b of transfer portion 3 are vertically displaceable so that they can be moved to positions corresponding to individual openings 2c of storage portion 2 to select disks 5.

Figure 24A:
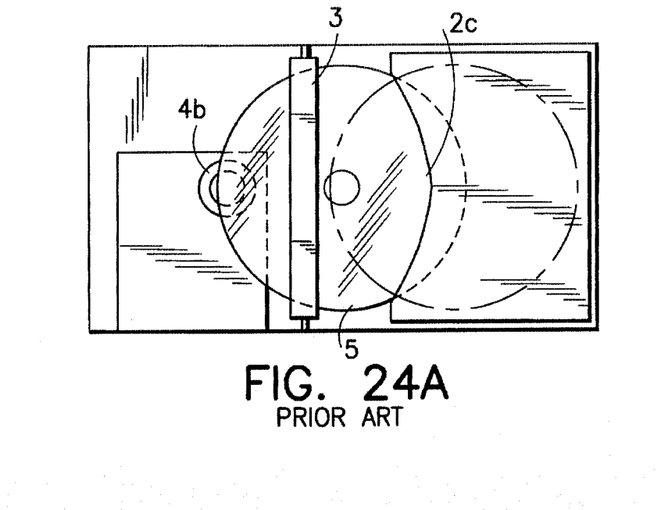
FIG. 24A is a top plan view of the prior art disk system at a disk transferring time.
Figure 24B:
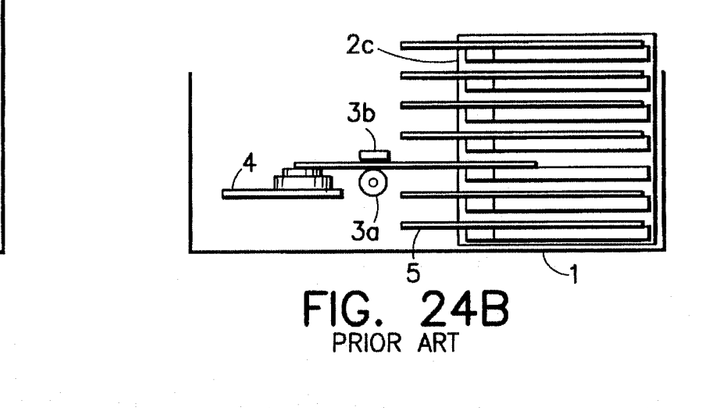
FIG. 24B is a front elevation view of the disk system of FIG. 24A.

Thus, when a desired disk 5 is to be selected (at the disk selecting time), as shown in FIG. 24, player portion 4 and transfer portion 3 are adjusted to the height of the tray 2b storing the target disk 5, with roller 3a and upguide plate 3b of transfer portion 3 being closed. After disk 5 is extracted by an extraction mechanism (not shown), its edge is clamped by roller 3a and upguide plate 3b.

When selected disk 5 is to be transferred (at the disk transferring time), roller 3a is rotated. Then, disk 5 is extracted from storage portion 2 and transferred to player portion 4, where it is placed on turntable 4b.

Figures 25A, 25B:
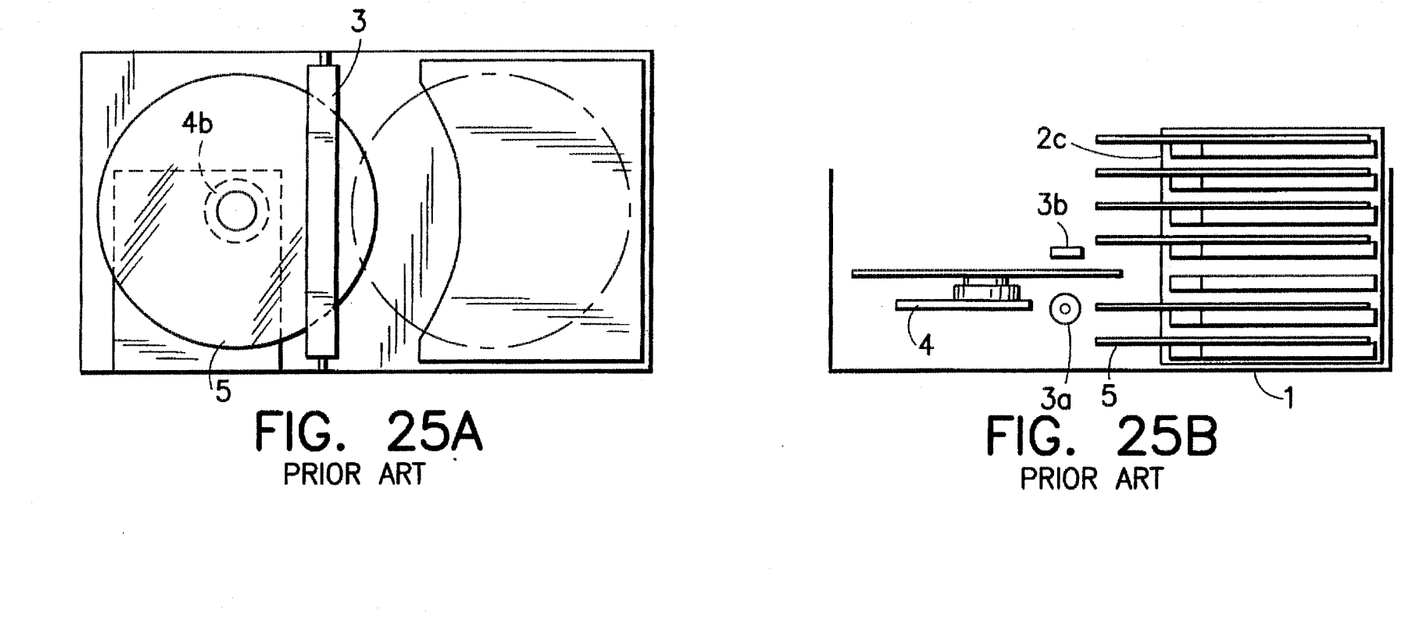
FIG. 25A is a top plan view of the prior art disk system at a playing time.
FIG. 25B is a front elevation view of the disk system of FIG. 25A.

When the data stored in transferred disk 5 is played (at the playing time), as shown in FIG. 25, roller 3a and upguide plate 3b are separated to release disk 5 and roller 3a moves away from disk 5 so that it does not obstruct rotation. As a result, disk 5 can be rotated on turntable 4b to perform the playing operation by the optical pickup. When disk 5 is returned to storage portion 2, roller 3a and upguide plate 3b are closed to clamp disk 5, which is slightly raised and moved toward storage portion 2 by rotating roller 3a in the direction opposite to that of the extraction.

In a disk system of the type described above, the distance between the center of turntable 4b and the center of disks 5 stacked in storage portion 2 is less than the disk diameter. As a result, a disk 5 in player portion 4 and disks 5 in storage portion 2 are partially overlapped. However, since the playing operation is carried out on a disk 5 which has been extracted from storage portion 2 without changing its vertical position, it does not interfere with the other disks 5 stacked in storage portion 2, but can be smoothly played. As a result, it is possible to increase the amount of overlap of the selected disk with those in storage, to reduce the size of the system.

Figure 26:
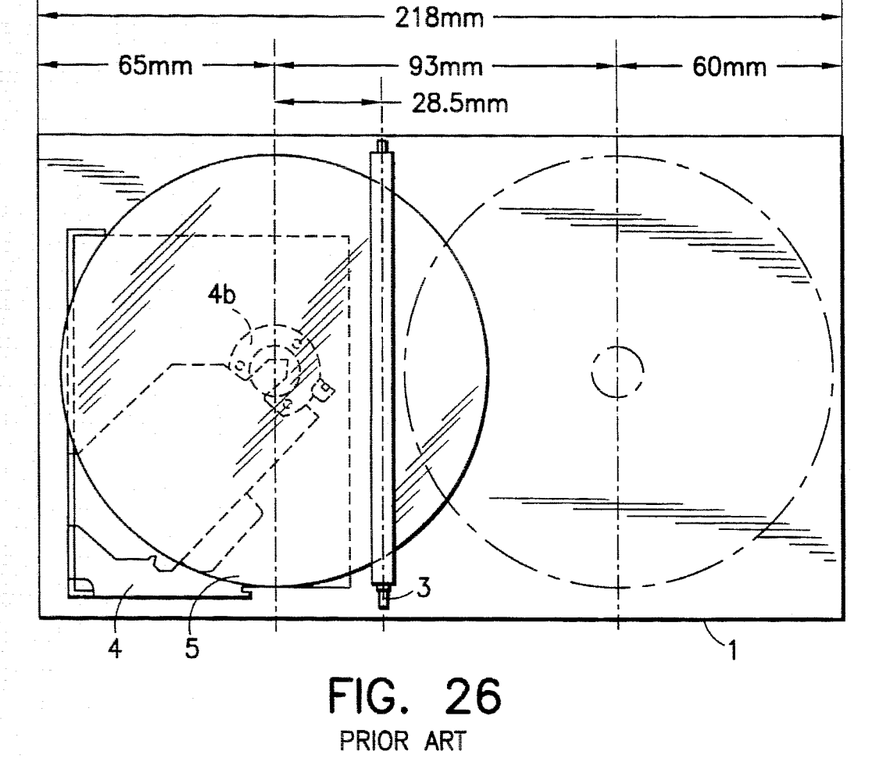
FIG. 26 is a top plan view showing the specific sizes of the components of the prior art disk system.

When such a disk system is utilized as a CD player, for example, the individual components are of the following sizes. Specifically, if two disks 5 are partially overlapped, as shown in FIG. 26, the distance between the center of turntable 4b and the center of disks 5 stacked in storage portion 2 can be set to 93 mm. Since a typical CD has a radius of 60 mm, the distance between the center of disks 5 in storage portion 2 and the righthand side of system chassis 1 is 60 mm. Since a gap of 5 mm is necessary to avoid interference with the rotation of disk 5, the distance between the center of turntable 4b and the lefthand side of system chassis 1 is 65 mm. As a result, the longitudinal size of system chassis 1 is 93+60+65=218 mm, which is 38 mm shorter than the dimension of 250 mm of the earlier system.

The demand for miniaturized electronic devices has increased in recent years, including the demand for smaller disk systems. However, the ability to reduce the size of the aforementioned disk system by further shortening the distance between storage portion 2 and player portion 4 is limited.

At the disk selecting time, transfer portion 3 is displaced vertically, necessitating a horizontal gap to prevent interference between a disk 5 in transfer portion 3 and those in storage portion 2.

If, for example, the distance between the center of turntable 4b and the center of disks 5 stacked in storage portion 2 is 93 mm, as in the aforementioned example of the CD player, transfer portion 3 is located 28.5 mm from the center of turntable 4b, as shown in FIG. 26. Considering that roller 3a and upguide plate 3b are opened and closed at the playing time, as shown in FIG. 27, 28.5 mm is the shortest distance between player portion 4 and transfer portion 3 allowing unimpeded disk rotation.

As a result, a minimum separation of the system components is required, especially at the disk selecting time and at the playing time, even if the system is to be miniaturized by overlapping two disks 5. Thus, the prior art approach cannot succeed in further reducing the distance separating system components.

OBJECTS AND SUMMARY OF THE INVENTION

Accordingly, it is an object of the invention to solve the problems described above and to provide a compact disk system which can select and play a disk smoothly without interference between system components, even if the disks of a storage portion and a player portion are closely overlapped.

In order to achieve these objects, there is provided a disk system comprising: a storage portion for storing a plurality of disks while supporting the same in a disk supporting direction normal to the surfaces of said disks; a player portion displaceable in the disk supporting direction, so that it moves in the disk supporting direction at a disk selecting time for selecting a desired disk from the plurality of disks stacked in said storage portion, and plays the desired disk at a playing time; and a transfer portion displaceable in the disk supporting direction, together with said player portion, such that it moves in the disk supporting direction, at said disk selecting time, to transfer the desired disk to said player portion from the plurality of disks stacked in said storage portion and transfers the desired disk, at a disk transferring time, back to said storage portion; wherein said transfer portion can move parallel to the surfaces of the disks stacked in said storage portion; wherein first displacement means is provided for displacing said transfer portion parallel to the surfaces of the disks stacked in said storage portion; wherein at said playing time, said first displacement means displaces said transfer portion proximate said storage portion; and wherein at said disk selecting time, said first displacement means displaces said transfer portion away from said storage portion.

According to a feature of the invention, said player portion is displaceable parallel to the surfaces of the disks stacked in said storage portion; second displacement means is provided for displacing said player portion parallel to the surfaces of the disks stacked in said storage portion; at said playing time, said second displacement means displaces said player portion proximate said storage portion; and at said disk selecting time, said second displacement displaces said player portion away from said storage portion.

Specifically, in one embodiment of the invention, at the disk selecting time, the transfer portion moves proximate the player portion and away from the storage portion. At the playing time, the transfer portion moves proximate the storage portion and away from the player portion. As a result, the longitudinal size of the system chassis can be reduced by an amount corresponding to the displacement of the transfer portion without any interference between the transfer portion and the disks in the storage portion and the player portion.

In a second embodiment, the player portion moves proximate the storage portion at the playing time but away from the storage portion at the disk selecting time. As a result, the longitudinal size of the system chassis can be reduced by an amount corresponding to the displacement of the player portion and the transfer portion without disturbing the arrangement of the disks.

The above and other objects, features and advantages of the present invention will become apparent from the following description read in conjunction with the accompanying drawings, in which components identical to those of the example of the prior art are designated with the same reference numerals, and their description has been omitted.

DETAILED DESCRIPTION OF THE FIRST PREFERRED EMBODIMENT

Figure 1A:
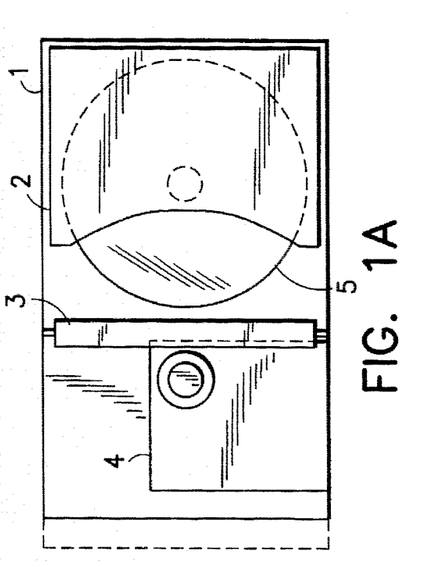
FIG. 1A is a simplified top plan view of a first embodiment of the present invention at a disk selecting time.
Figure 1B:
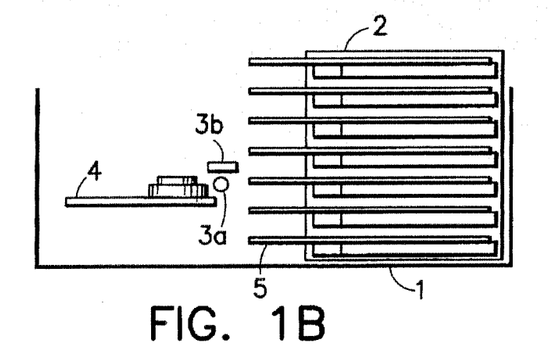
FIG. 1B is a simplified front elevation view of the embodiment of FIG. 1A.
Figure 2A:
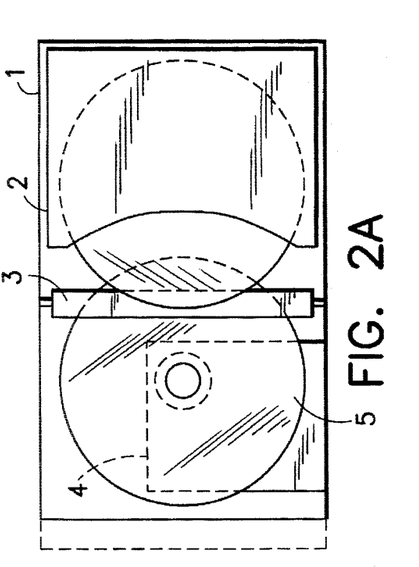
FIG. 2A is a simplified top plan view of the first embodiment of the present invention at a playing time.
Figure 2B:
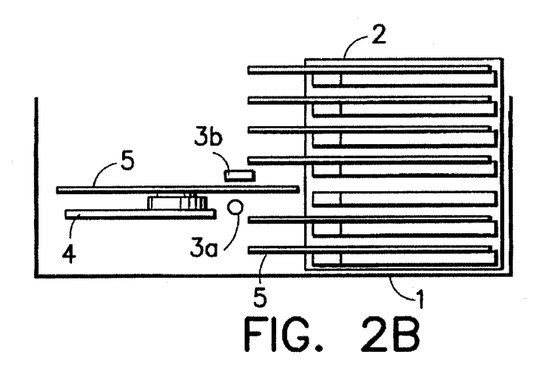
FIG. 2B is a simplified front elevation view of the embodiment of FIG. 2A.

Turning now to FIGS. 1 and 2, it is seen that this first embodiment of the invention differs from the example of the prior art device in that player portion 4 and transfer portion 3 are arranged closer to each other to reduce the longitudinal size of system chassis 1, as indicated by broken lines in FIG. 1. Likewise, transfer portion 3 and storage portion 2 are arranged closer to each other as indicated by broken lines in FIG. 2.

During the disk selecting operation, transfer portion 3 and player portion 4, which are kept slightly apart from each other in the vertical direction so that the rotary motion of the roller 3a is not obstructed, move together in the vertical direction, whereby transfer portion 3 and player portion 4 never contact each other. During this operation, therefore, they need not be separated in the horizontal direction, but rather, as shown in FIG. 1, they can overlap each other to the extent that the rotary motion of roller 3a is not impeded.

At the time of playing a disk, on the other hand, transfer portion 3 need not be displaced in the disk supporting direction to avoid collision with disks 5 in storage portion 2. During the playing time, therefore, little clearance is required in the horizontal direction between transfer portion 3 and storage portion 2. Accordingly, no problem arises even if transfer portion 3 projects between the upper and lower disks 5 stacked in storage portion 2, as shown in FIG. 2, so long as the motions of roller 3a and upguide plate 3b are not obstructed.

In short, at the disk selecting time, transfer portion 3 may be close to player portion 4 but not to storage portion 2. At the playing time, on the other hand, transfer portion 3 may be close to storage portion 2 but not to player portion 4.

In the disk system of this embodiment, transfer portion 3 can move in the longitudinal direction between player portion 4 and storage portion 2. At the disk selecting time, transfer portion 3 can be moved close to player portion 4 and away from storage portion 2. At the playing time, on the other hand, transfer portion 3 can be moved close to storage portion 2 and away from player portion 4.

As a result, transfer portion 3 can avoid interference with disks 5 in storage portion 2 or player portion 4 even if player portion 4 and storage portion 2 are arranged closer to each other than the example of the prior art. It is possible to reduce the longitudinal size of system chassis 1 by the distance of movement of transfer portion 3.

Figure 3:
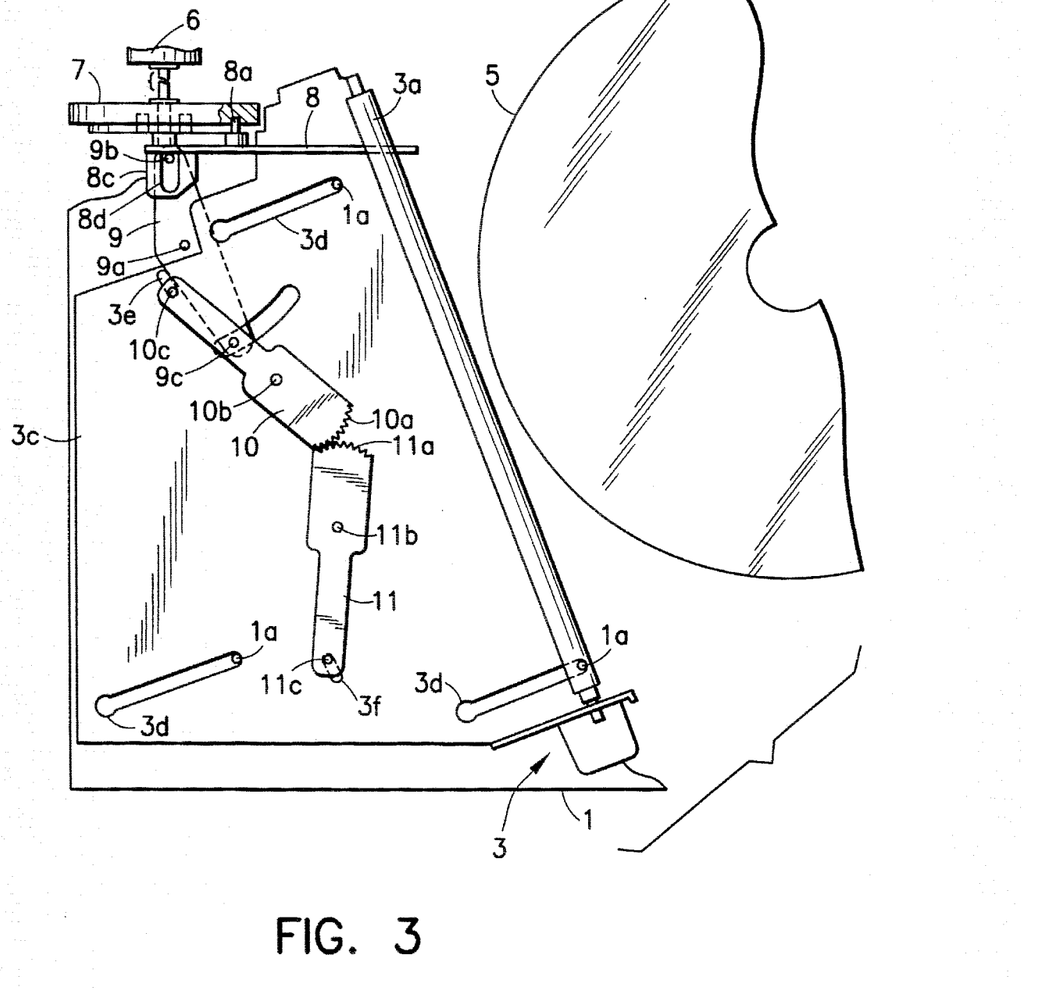
FIG. 3 is a top plan view of the first embodiment of the present invention system at a disk selecting time.

Turning now to FIG. 3, it is seen that the individual components are disposed in system chassis 1, which has a rectangular box shape. System chassis 1 supports storage portion 2 (not shown) at the righthand side, player transfer portion 3 at the central portion, and player portion 4 at the lefthand side.

The individual components will now be described in comparison with those of the example of the prior art. Storage portion 2 is identical to the corresponding component of the prior art.

Transfer portion 3 includes roller plate 3c, having a trapezoidal shape, and roller 3a and upguide plate 3b, which are disposed in parallel over the righthand oblique side of roller plate 3c. These elements are similar to those of the example of the prior art. Roller plate 3c is so disposed on the bottom of system chassis 1 that it can move perpendicularly to the center axis of roller 3a. Roller plate 3c has its bottom formed with two front and one rear slide holes 3d. Slide holes 3d are slotted perpendicularly to roller 3a (as will be called the "oblique leftward and rightward directions") to receive three support pins 1a projecting from system chassis 1. This arrangement allows roller plate 3c to move only in the oblique leftward and rightward directions. Roller plate 3c further includes a first rear rotation hole 3e and a second front rotation hole 3f, both elongated parallel to roller 3a.

Player portion 4 has the same configuration as the corresponding element in the example of the prior art.

The mechanism for driving transfer portion 3 includes a drive source and a drive mechanism. The drive source is composed of a motor 6 and a rotary cam 7. The drive mechanism is composed of a cam plate 8, a turn plate 9, a first gear plate 10 and a second gear plate 11.

Motor 6 is disposed at the lefthand rear of system chassis 1 and has its shaft oriented parallel to the short side of system chassis 1.

Figure 4:
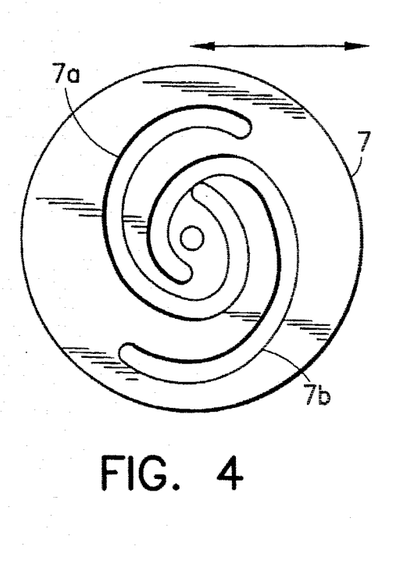
FIG. 4 is a side elevation showing a rotary cam in the first embodiment.

Rotary cam 7 is a disk-shaped plate having, at its center, an axial hole, in which is fixed the shaft of motor 6. As seen in FIG. 4, rotary cam 7 is formed with two helical grooves: a first cam groove 7a and a second cam groove 7b. First cam groove 7a is used to drive transfer portion 3.

Figure 5:
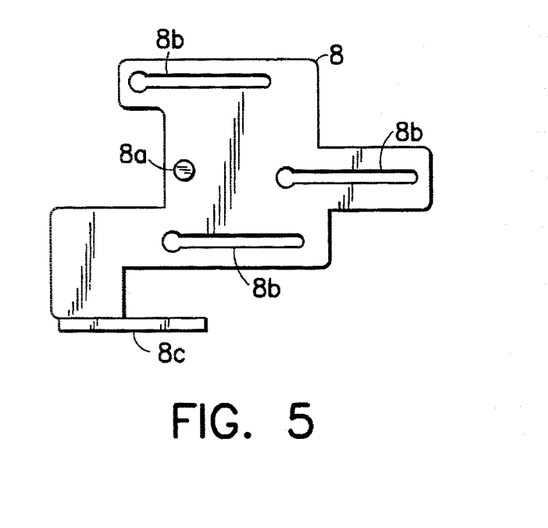
FIG. 5 is a side elevation showing a cam plate for moving a transfer portion in the first embodiment.
Figure 6:
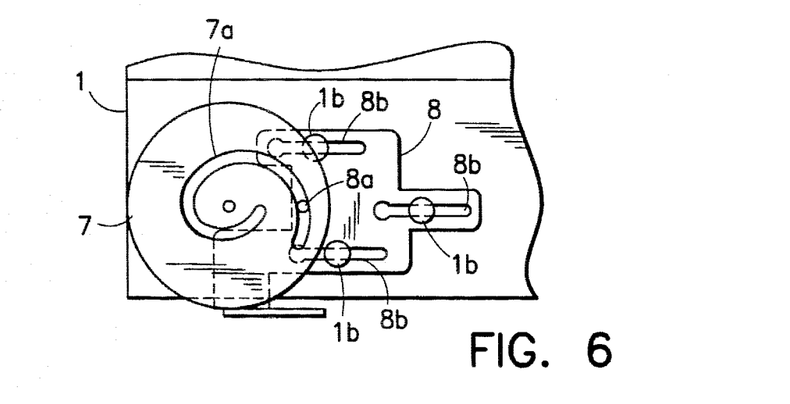
FIG. 6 is a rear side elevation of the disk system of FIG.

Cam plate 8 is a rectangular member including an engagement pin 8a, best seen in FIG. 5, which engages first cam groove 7a of rotary cam 7. Cam plate 8 has three mutually parallel transverse slide holes 8b. As shown in FIG. 6, system chassis 1 has three pins 1b at positions corresponding to slide holes 8b of cam plate 8. Thus, plate 8 is constrained to move leftwardly and rightwardly when pins 1b engage slide holes 8b. Cam plate 8 further includes, at its lefthand lower end, a portion 8c which is bent forward at a right angle. This folded portion 8c has a square regulator hole 8d.

As shown in FIG. 3, turn plate 9 is a transversely elongated member which is so disposed on the bottom of system chassis 1 that it can rotate about a pivot pin 9a fitted thereon. Turn plate 9 is equipped, at its two end portions, with pins 9b and 9c. Pin 9b engages regulator hole 8d of cam plate 8. Pin 9c, at the other end portion, engages the central portion of the later-described first gear plate 10 such that turn plate 9 is rotatably connected to first gear plate 10.

As shown in FIG. 3, first gear plate 10 is a transversely elongated member having, at one end, gear teeth 10a and at the other end, a movable pin 10c, which is rotatably fitted in first rotation hole 3e of roller plate 3c. First gear plate 10 is rotatably supported b pin 10b fixed on system chassis 1.

Second gear plate 11 has the same shape as first gear plate 10 and has, at one end, gear teeth 11a and, at the other end, a movement pin 11c which is rotatably fitted in a second rotary hole 3f of roller plate 3a. Second gear plate 11 is rotatably supported by pin 11b on system chassis 1. Gear teeth 10a of first gear plate 10 engage gear teeth 11a of second gear plate 11.

The operation of the first embodiment will now be described with reference to FIGS. 6 to 10.

Figure 7:
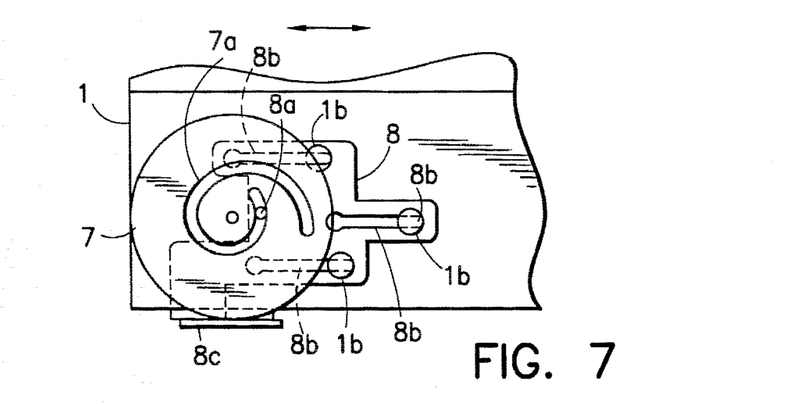
FIG. 7 is a rear side elevation of the disk system of FIGS. 2A and 2B.

As best seen in FIG. 7, cam plate 8 is constrained by pin 1b, on the rear side of system chassis 1, to move only leftwardly and rightwardly. Accordingly, its engagement pin 8a is also constrained to move only leftwardly and rightwardly. As a result, cam plate 8 slides leftwardly and rightwardly (i.e. in the directions of the arrows of FIG. 7) in accordance with the rotation of rotary cam 7.

Figure 8:
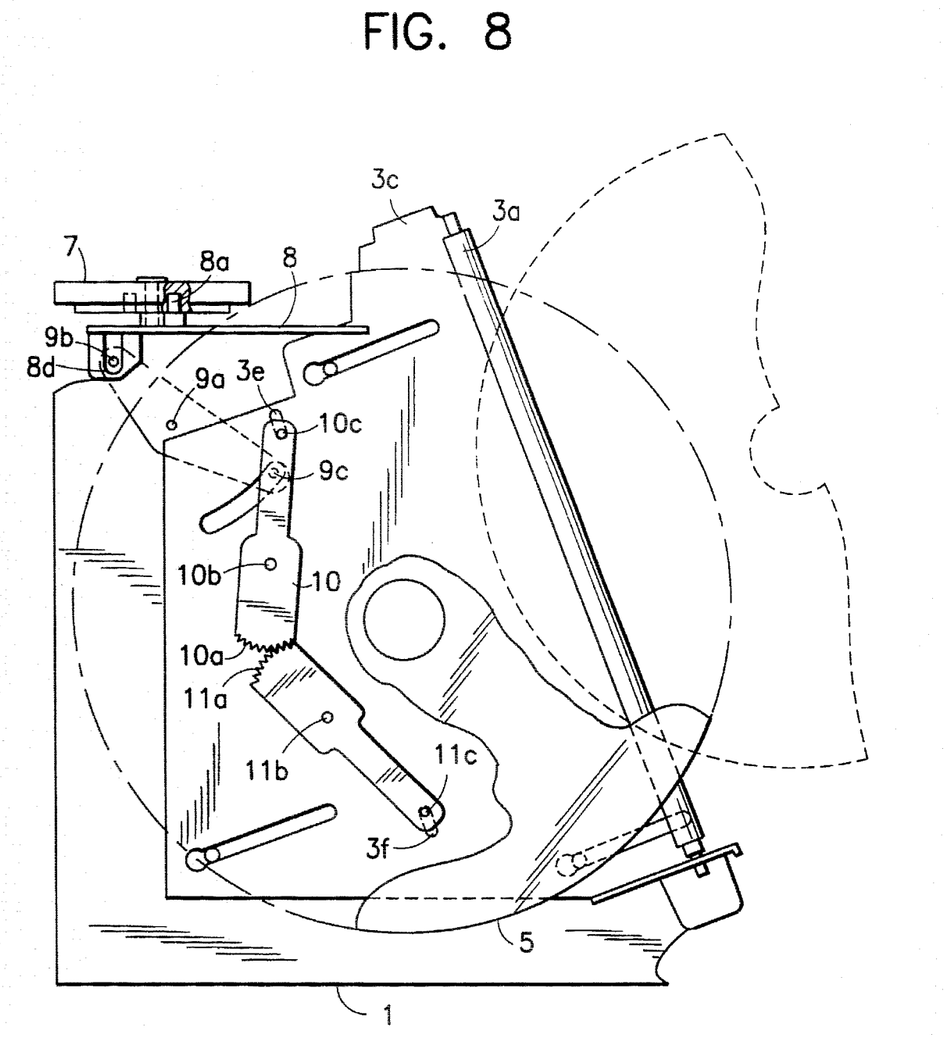
FIG. 8 is a top plan view of the disk system of FIG. 2A.

When cam plate 8 slides leftwardly, pin 9b of turn plate 9, engaging regulating hole 8d of cam plate 8 is also moved leftwardly, as shown in FIG. 8. Turn plate 9 rotates on pivot pin 9a to bring pin 9c at its opposite end portion to the right.

When pin 9c moves rightwardly, first gear plate 10 rotates on pin 10b, causing gear teeth 10a to rotate in a clockwise direction. This, in turn, causes second gear plate 11 to rotate counter-clockwise about pin 11 as gear teeth 10a engage gear teeth 11a on gear plate 11. Movement pin 11c, at the opposite end of gear plate 11, is thus caused to move rightwardly.

Movement pin 10c and movement pin 11c are rotatably fitted in first rotation hole 3e and second rotation hole 3f respectively, so that roller plate 3c is allowed to slide only obliquely leftwardly and rightwardly. As a result, when movement pins 10c and 11c move rightwardly, roller plate 3c is urged rightwardly adjacent storage portion 2.

The advantages of the above-described embodiment will be made clear by enumerating specific sizes of the individual components. In order to facilitate understanding, the description will be based on an arrangement in which transfer portion 3 has its roller 3a and upguide plate 3b set not obliquely, but perpendicularly to the longitudinal direction of system chassis 1. Despite this minor alteration, the construction and operation of the individual components are similar to those of the embodiment described above.

Figure 9:
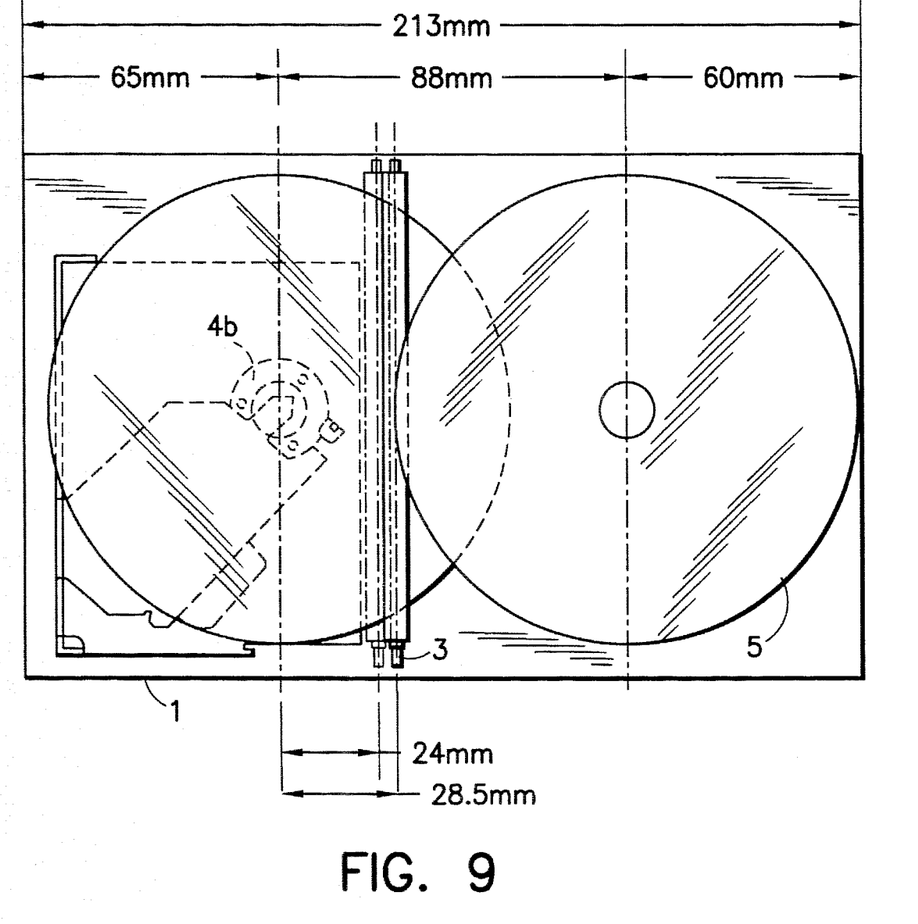
FIG. 9 is a top plan view showing the specific sizes of the components of the first embodiment of the present invention.

As shown in FIG. 9, the distance between the center of turntable 4b and the center of disks 5 stacked in storage portion 2 is 88 mm. Since a distance of 60 mm from the righthand side of system chassis 1 to the center of disks 5 stacked in storage portion 2 and a distance of 65 mm from the lefthand side of system chassis 1 to the center of turntable 4b are necessary for reasons similar to those of the example of the prior art, the longitudinal size of system chassis 1 is 213 mm. Moreover, the distance between transfer portion 3 and the center of turntable 4b is 24 mm. Transfer portion 3 in this position will not interfere with disks 5 in storage portion 2 even if it moves vertically at the disk selecting time. However, the distance between transfer portion 3 and turntable 4b becomes shorter by 4.5 mm than the distance of 28.5 mm which in the prior art device was necessary to maintain a stable playback operation.

Figure 10:
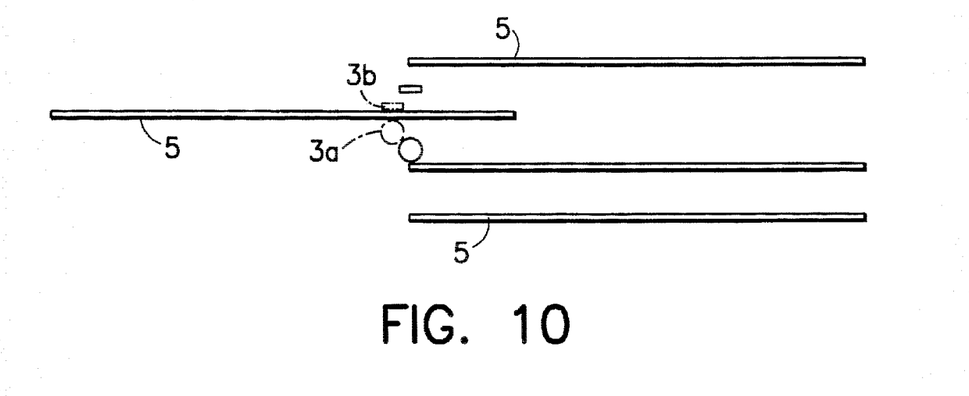
FIG. 10 is a front elevation view showing the positional relations between the disks and the transfer portion of the first embodiment of the present invention.

In operation, disk 5 is first extracted from storage portion 2 and is set in player portion 4. Next, motor 6 is energized to rotate rotary cam 7. Then roller plate 3c is displaced closer to storage portion 2, as shown in FIG. 9, by the aforementioned action of first cam groove 7a. Roller 3a and upguide plate 3b enter between disks 5 which are stacked above and below extracted disk 5, as shown in FIG. 10. At the playing time, disk 5 can be rotated because roller 3a and upguide plate 3b are separated. During the playing time, transfer portion 3 is not displaced vertically. Thus, transfer portion 3 is prevented from interfering with disks 5 in storage portion 2 because upper and lower disks 5 leave a gap wherein roller 3a and upguide plate 3b separate. As a result, the necessary separation of 28.5 mm can be maintained between transfer portion 3 and turntable 4b at the playing time by displacing transfer portion 3 4.5 mm.

Since the distance between the center of turntable 4b and the center of disks 5 stacked in storage portion 2 can be thus reduced by 4.5 mm from that of the example of the prior art, the longitudinal size of system chassis 1 can be reduced by 4.5 mm.

DETAILED DESCRIPTION OF THE SECOND PREFERRED EMBODIMENT

Figure 11A:
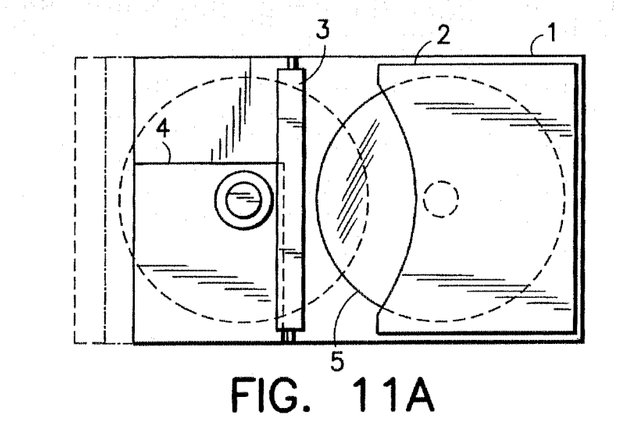
FIG. 11A is a simplified top plan view of a second embodiment of the present invention at a disc selecting time.
Figure 11B:
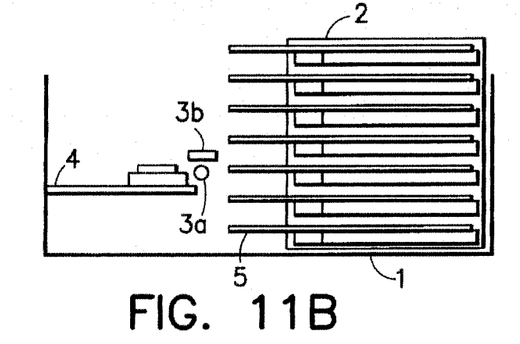
FIG. 11B is a simplified front elevation view of the embodiment of FIG. 11A.
Figure 12A:
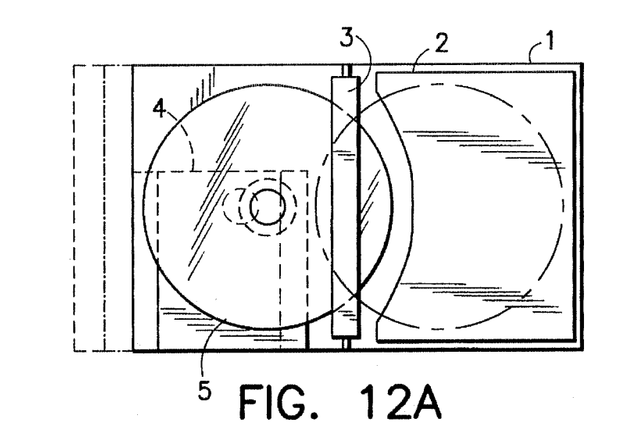
FIG. 12A is a simplified top plan view of the second embodiment of the present invention at a playing time.
Figure 12B:
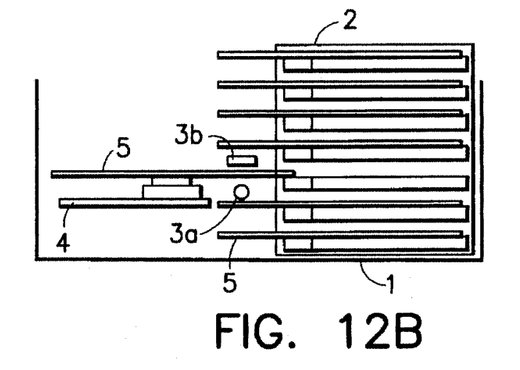
FIG. 12B is a simplified front elevation view of the embodiment of FIG. 12A.

Turning to FIGS. 11 and 12, there is seen a second preferred embodiment of the invention. The description of elements similar to those of the first preferred embodiment has been omitted. This second embodiment differs from the first in that no gap is maintained between player portion 4 and the lefthand side of system chassis 1, and transfer portion 3 is arranged closer to storage portion 2 to shorten the longitudinal size of system chassis 1 to an extent indicated by single-dotted lines in FIG. 11.

In the disk system of this second embodiment, player portion 4 can also be moved in the longitudinal direction of system chassis 1. As a result, it is possible to bring player portion 4 close to storage portion 2 at the playing time and away from storage portion 2 at the disk selecting time.

It is thus seen, therefore, that the playing of disk 5 is not obstructed even if no gap is left between player portion 4 and the lefthand side of system chassis 1. This allows reduction of the longitudinal size of system chassis 1 by a distance corresponding to the displacements of player portion 4 and transfer portion 3.

As best seen in FIGS. 13 to 17, this second embodiment differs from the first embodiment in that player portion 4 is mounted on the bottom of system chassis 1 so as to move longitudinally.

This system includes a drive source and a drive mechanism. The drive source is composed of motor 6 and rotary cam 7. The drive mechanism is composed of cam plate 12, third gear plate 13, fourth gear plate 14 and auxiliary plate 15. The components of the drive source are identical to those of the first embodiment, and their description will be omitted. It is to be noted that second cam groove 7b, formed in rotary cam 7, is used for driving player portion 4.

Figures 13, 14, 15:
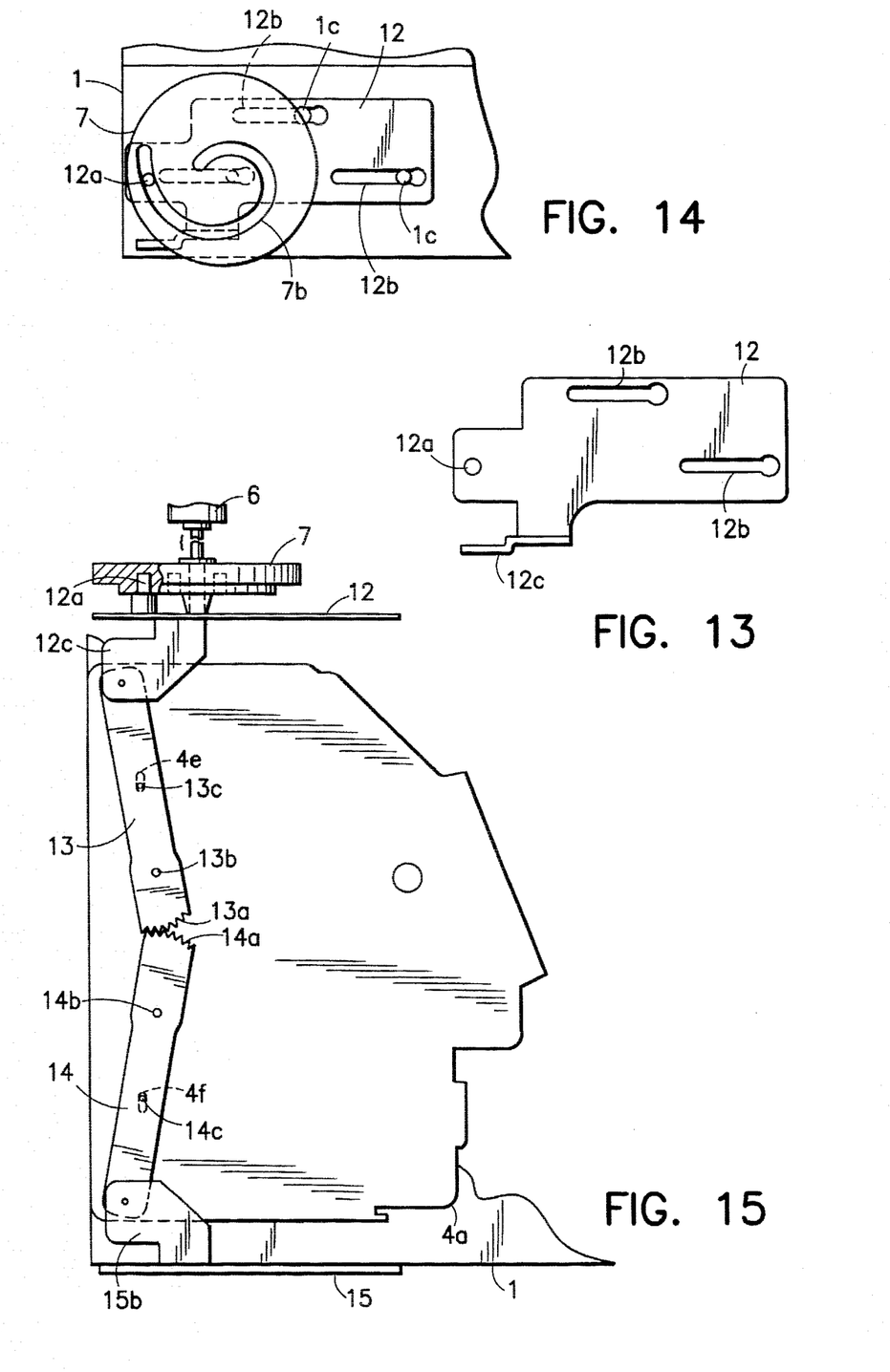
FIG. 13 is a side elevation view showing a cam plate for displacing a player portion of the second embodiment of the present invention.
FIG. 14 is a rear side elevation view showing the second embodiment of the present invention at the disk selecting time.
FIG. 15 is a top plan view of the disk system of FIG. 14.

As shown in FIG. 13, rectangular cam plate 12 includes an engagement pin 12a which engages second cam groove 7b of rotary cam 7. Cam plate 12 is formed with three mutually parallel transverse slide holes 12b. As shown in FIG. 14, system chassis 1 has two projecting pins 1c at positions corresponding to slide holes 12b of cam plate 12. Thus, cam plate 12 is constrained to move leftwardly and rightwardly when pins 1c engage slide holes 12b. Cam plate 12 further includes, at its lefthand lower end portion, a portion 12c which is bent forward at a right angle.

As best seen in FIG. 15, third gear plate 13 is a transversely elongated member having, at one end, gear teeth 13a. The other end of gear plate 13 is rotatably connnected to folded portion 12c of cam plate 12. Gear plate 13 is itself rotatably supported on pin 13b fixed on traverse plate 4a.

Fourth gear plate 14 has the same shape as third gear plate 13 and has, at one end, gear teeth 14a and, at the other end, is rotatably connected to a folded portion 15b of later described auxiliary plate 15. Fourth gear plate 14 is itself rotatably carried on pin 14b on traverse plate 4a. Gear teeth 13a of first gear plate 13 engage gear teeth 14a of fourth gear plate 14.

Figure 16:
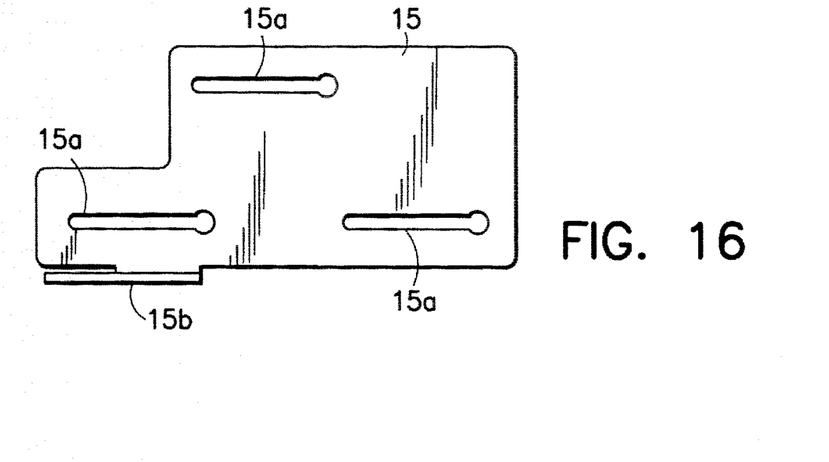
FIG. 16 is a side elevation view showing an auxiliary plate of the second embodiment of the present invention.
Figure 17:
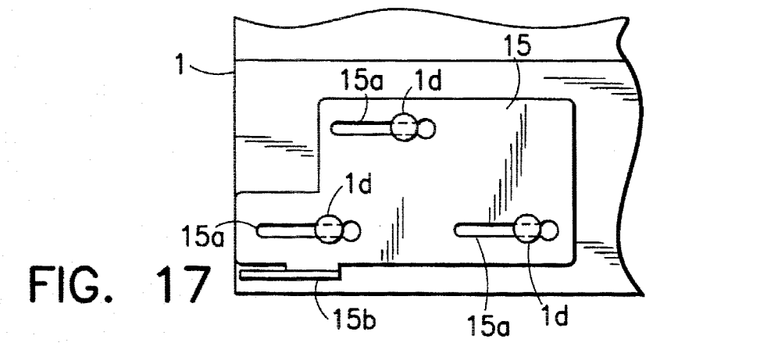
FIG. 17 is a front elevation view of the disk system of FIG. 14.

As shown in FIG. 16, auxiliary plate 15 is a rectangular member having three mutually parallel transverse slide holes 15a. As best seen in FIG. 17, system chassis 1 includes, on its front side, three pins 1d at positions corresponding to slide holes 15a. Thus, auxiliary plate 15 is constrained to move leftwardly and rightwardly when pins 1d engage slide holes 15a. Auxiliary plate 15 further includes, at its lefthand lower end, a portion 15b which is bent back at a right angle and rotatably connected to fourth gear plate 14.

The operation of the second embodiment will now be described with reference to FIGS. 18 to 20. The operation of the drive source is substantially the same as that of the drive source of the first embodiment in that engagement pin 12a, engaging second cam groove 7b formed in rotary cam 7, is displaced leftwardly and rightwardly in accordance with the rotation of rotary cam 7 so that cam plate 12, having its engagement pin 12a fixed, also is displaced leftwardly and rightwardly.

Figure 18:
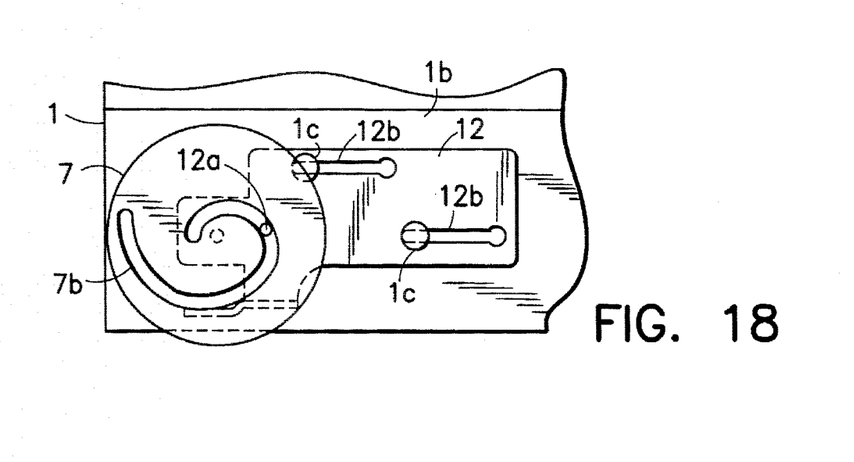
FIG. 18 is a rear side elevation view showing the second embodiment of the present invention at the playing time.

When cam plate 12 slides and moves rightwardly, as shown in FIG. 18, its folded portion 12c also moves rightwardly. Since folded portion 12c and end portion of third gear plate 13 are rotatably connected, third gear plate 13 turns clockwise on pin 13b, such that gear teeth 13a, at the opposite end, also turn clockwise.

Figure 19:
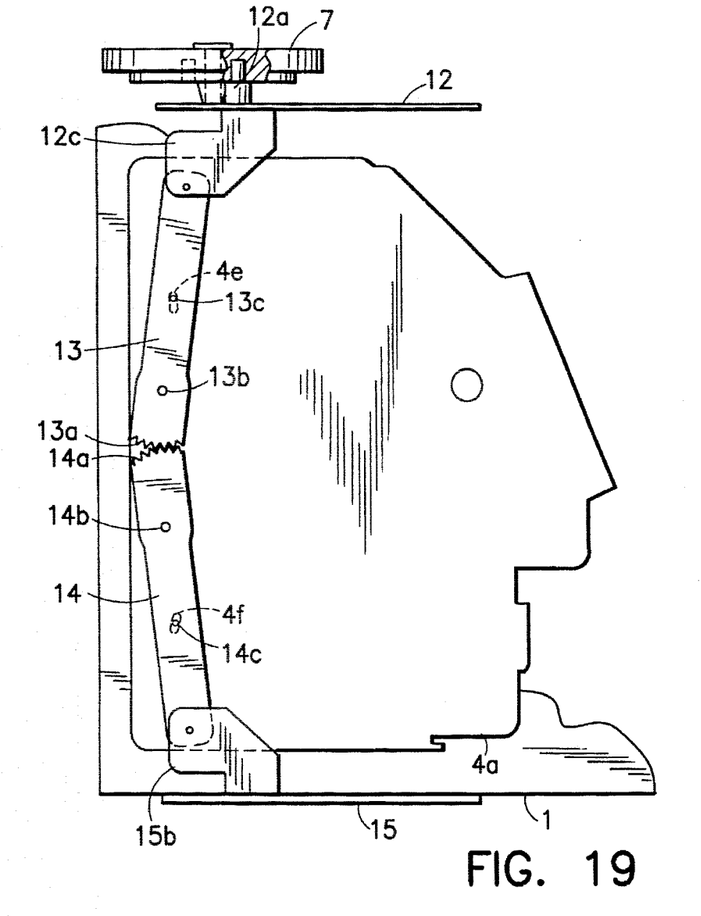
FIG. 19 is a top plan view of the disk system of FIG. 18.
Figure 20:
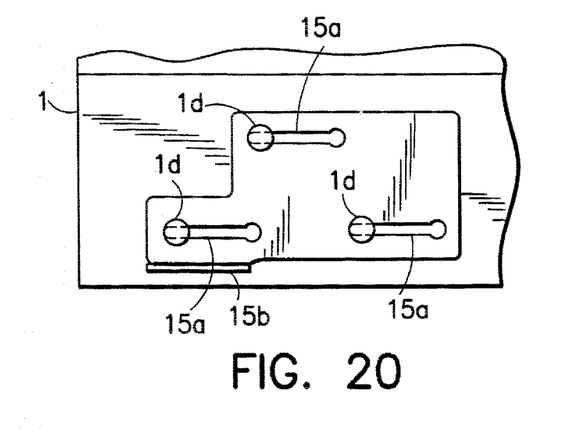
FIG. 20 is a front elevation of the disk system of FIG. 18.

When third gear plate 13 turns clockwise, as shown in FIG. 19, fourth gear plate 14 turns counter-clockwise on pin 14b, as gear teeth 13a engage gear teeth 14a. This causes the opposite end of fourth gear plate 14 to move rightwardly together with auxiliary plate 15.

Third gear plate 13 and fourth gear plate 14 are rotatably attached to traverse plate 4a, which is displaceable leftwardly and rightwardly. When cam plate 12 and auxiliary plate 15 move rightwardly, traverse plate 4a is urged rightwardly adjacent storage portion 2.

The advantages of the above-described embodiment will be made clear by enumerating specific sizes of the individual components.

Figure 21:
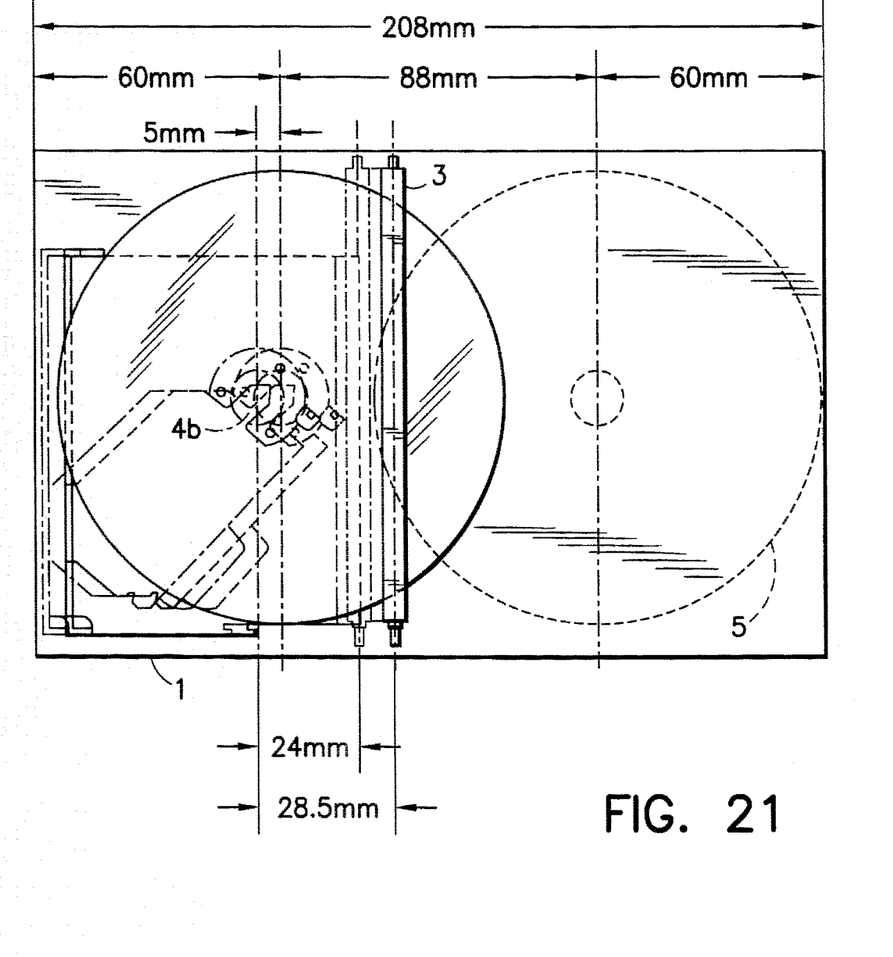
FIG. 21 is a top plan view showing the specific sizes of the components of the second embodiment of the present invention.
Figure 22:
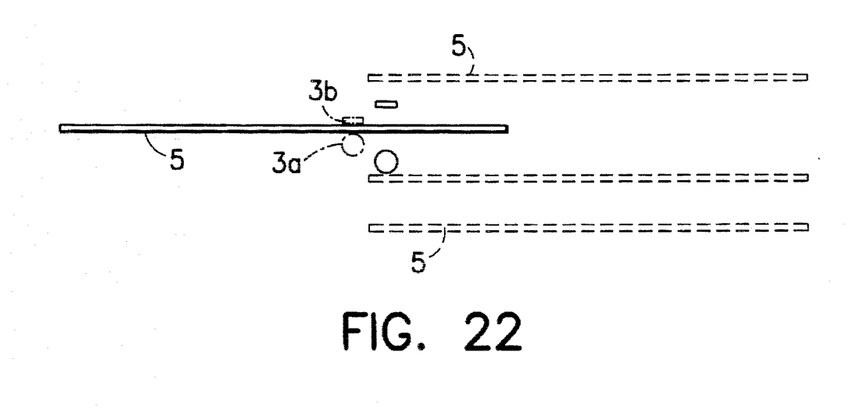
FIG. 22 is a front elevation view showing the positional relations between the disks and the transfer portion of the second embodiment of the present invention.

As shown in FIG. 21, the distance between the center of turntable 4b and the center of disks 5 stacked in stock portion 2 is 88 mm, as in the first embodiment, and the distance from the righthand side of system chassis 1 to the center of disks 5 stacked in storage portion 2 is 60 mm. Unlike the example of the prior art and the first embodiment, a gap of 5 mm is not maintained between player portion 4 and the lefthand side of system chassis 1, hence the distance from the lefthand side of system chassis 1 to the center of turntable 4b is 60 mm. The distance between transfer portion 3 and the center of turntable 4b is 24 mm. Transfer portion 3 in this position is prevented from interfering with disks 5 in storage portion 2, as shown in FIG. 22, even if it is vertically moved at the disk selecting time. However, the distance between transfer portion 3 and turntable 4b is now 4.5 mm shorter than the 28.5 necessary for stable playing operations. Moreover, rotation of disk 5 would be obstructed at the playing time because the clearance gap of 5 mm is not present between player portion 4 and system chassis 1.

To overcome these problems, rotary cam 7 is rotated when disk 5 is extracted from storage portion 2 and set in player portion 4. As shown in FIG. 21, this causes displacement of traverse plate 4a toward storage portion 2 by engagement with second cam groove 7b. Simultaneously, roller plate 3c is displaced adjacent storage portion 2 by engagement with first cam groove 7b. By limiting the displacement of transfer portion 3 to 9.5 mm and the displacement of traverse plate 4a to 5 mm, it is possible at the playing time, to maintain the necessary distance of 28.5 mm between transfer portion 3 and turntable 4b and the necessary separation of 5 mm between player portion 4 and system chassis 1.

As a result, the distance between the center of turntable 4b and the center of disks 5 stored in storage portion 2 is 4.5 mm less than that of the example in the prior art. Moreover, it is unnecessary to retain the 5 mm side clearance. Thus, the longitudinal size of system chassis 1 can be shortened by 4.5+5=9.5 mm.

As has been described hereinbefore, the present invention permits reduction of the longitudinal size of system chassis 1 by 4.5 mm in the first embodiment and by 9.5 mm in the second embodiment. As a result, if the system is used in an audio device for an automobile, it may be installed in a smaller compartment. If system chassis 1 is the same size as that of the example of the prior art, a space of 9.5 mm can be utilized for other purposes, such as the addition of a liquid crystal display.

It is to be noted that disks 5 are of a standard diameter. If the length of transfer portion 3 is less than this diameter, it cannot transfer disk 5 stably. As a result, if transfer portion 3 is oriented perpendicular to the longitudinal direction of system chassis 1, as in the example of the prior art, the shorter side of system chassis 1 cannot be shorter than the length of transfer portion 3. In the present invention, therefore, the shorter side of system chassis 1 is shortened to reduce the size of the system by arranging roller 3a and upguide plate 3b of transfer portion 3 obliquely. In short, by arranging transfer portion 3 obliquely, the shorter side of system chassis 1 can be drastically reduced, in addition to the reduction in the longitudinal direction.

While the first embodiment offers a lesser size reduction than the second embodiment, its mechanism is less complicated.

Having described preferred embodiments of the invention with reference to the accompanying drawings, it is to be understood that the invention is not limited to those precise embodiments, and that various changes and modifications may be effected therein by one skilled in the art without departing from teh scope or spirit of the invention as defined in the appended claims. For example, the size of system chassis 1 can be further reduced by thinning roller 3a of transfer portion 3 and by reducing the size of traverse plate 4a. Moreover, the size of a disk system, in which disks 5 of storage portion 3 and disk 5 of player portion 4 are not overlapped, can be reduced by applying the present invention thereto.

What is claimed is:

1. In a disk system of the type comprising:

a system chassis;

storage means, disposed proximate one end of said system chassis, for storing a plurality of data storage disks in a vertical stack:

player means, disposed on said system chassis, horizontally opposite said storage means, for receiving a selected disk from said storage means and for processing the data stored therein, said player means including a turntable; and transfer means disposed on said system chassis directly horizontally between said storage means and said player means, for transferring a selected disk therebetween, said transfer means including at least one roller member adapted for contacting engagement with the selected disk;

the improvement comprising: first displacement means for horizontally displacing said at least one roller member between a first transfer position, adjacent said storage means, and a second transfer position, adjacent said player means;

said at least one roller member being in said first transfer position when said player means is processing data from the selected disk and, when in said first transfer position, lying directly within the outer periphery of the disks within the vertical stack stored in said storage means.

2. The disk system of claim 1, further comprising second displacement means for horizontally displacing said turntable between a first player position, remote from said storage means, and a second player position, closer to said storage means.

3. The disk system of claim 2, wherein said turntable is in said second player position when said player means is processing data from the selected disk.

4. A disk system of the type comprising:

a system chassis;

storage means, disposed proximate one end of said system chassis, for storing a plurality of data storage disks in a vertical stack;

player means, disposed on said system chassis, opposite said storage means for receiving a selected disk from said storage means and for processing the data stored therein, said player means including a turntable; and transfer means, disposed on said system chassis intermediate said storage means and said player means, for transferring a selected disk therebetween, said transfer means including at least one roller member adapted for engagement with the selected disk;

the improvement comprising: first displacement means for horizontally displacing said at least one roller member toward said storage means and away from said turntable after the transfer of the selected disk from storage means to said turntable and for displacing said at least one roller member toward said turntable and away from said storage device after the return of the selected disk from said turntable to said storage means, said at least one roller member lying directly within the outer periphery of the disks within the vertical stack stored in said storage means when in said first transfer position.

5. The disk system of claim 4, further comprising second displacement means for horizontally displacing said turntable between a first player position, remote from said storage means, and a second player position, closer to said storage means.

6. The disk system of claim 5, wherein said turntable is in said second player position when said player means is processing data from the selected disk.

7. A disk system comprising:

a system chassis;

storage means, disposed proximate one end of said system chassis, for storing a plurality of data storage disks in a vertical stack;

player means, vertically displaceably disposed on said system chassis, opposite said storage means, for receiving a selected disk from said storage means and for processing the data stored therein;

transfer means, vertically displaceably disposed on said system chassis, intermediate said storage means and said player means, for transferring a selected disk therebetween, said transfer means including at least one roller member adapted for engagement with a planar surface of the selected disk; and first displacement means for horizontally displacing said at least one roller member between a first transfer position, adjacent said storage means, and a second transfer position, adjacent said player means;

said at least one roller member being in said first transfer position when said player means is processing data from the selected disk and, when in said first transfer position, lying directly within the periphery of the disks within the vertical stack stored in said storage means.

8. The disk system of claim 7, further comprising second displacement means for horizontally displacing said turntable between a first player position, remote from said storage means, and a second player position, closer to said storage means.

9. The disk system of claim 8, wherein said turntable is in said second player position when said player means is processing data from the selected disk.

* * * * *